(12) United States Patent
Zhou et al.

(10) Patent No.: US 9,682,343 B2
(45) Date of Patent: Jun. 20, 2017

(54) SOUR SYNGAS TREATMENT APPARATUSES AND PROCESSES FOR TREATING SOUR SYNGAS COMPRISING SULFUR COMPONENTS AND CARBON DIOXIDE

(71) Applicant: UOP LLC, Des Plaines, IL (US)

(72) Inventors: Lubo Zhou, Inverness, IL (US); Bart Beuckels, Gent (BE); Ernest James Boehm, Hanover Park, IL (US)

(73) Assignee: UOP LLC, Des Plaines, IL (US)

( * ) Notice: Subject to any disclaimer, the term of this patent is extended or adjusted under 35 U.S.C. 154(b) by 300 days.

(21) Appl. No.: 14/682,636

(22) Filed: Apr. 9, 2015

(65) Prior Publication Data

US 2016/0296878 A1 Oct. 13, 2016

(51) Int. Cl.
*C10K 1/08* (2006.01)
*C10K 1/34* (2006.01)
(Continued)

(52) U.S. Cl.
CPC ........ *B01D 53/1462* (2013.01); *C01B 17/043* (2013.01); *C10K 1/08* (2013.01); *C10K 1/34* (2013.01); *B01D 53/1406* (2013.01); *B01D 2252/2021* (2013.01); *B01D 2252/2025* (2013.01); *B01D 2252/20468* (2013.01); *B01D 2256/16* (2013.01); *B01D 2256/20* (2013.01); *B01D 2256/24* (2013.01); *B01D 2257/302* (2013.01); *B01D 2257/304* (2013.01); *B01D 2257/308* (2013.01); *B01D 2257/504* (2013.01)

(58) Field of Classification Search
CPC ............ B01D 53/1406; B01D 53/1462; B01D 2252/2021; B01D 2252/2025; B01D 2252/20468; B01D 2256/16; B01D 2256/20; B01D 2256/24; B01D 2257/302; B01D 2257/304; B01D 2257/308; B01D 2257/504; C01B 17/043; C10K 1/08; C10K 1/34
USPC .......... 95/149, 204, 223, 235, 236; 423/220, 423/226, 228, 229, 244.01, 244.09
See application file for complete search history.

(56) References Cited

U.S. PATENT DOCUMENTS 4,233,276 A * 11/1980 D'Souza .............. B01D 53/508
208/120.05
6,485,697 B1 * 11/2002 Chao .................. B01D 53/1462
423/220

(Continued)

*Primary Examiner* — Frank Lawrence

(57) ABSTRACT

Sour syngas treatment apparatuses and processes for treating a sour syngas stream are provided herein. In an embodiment, a process for treating a sour syngas stream that includes sulfur components and carbon dioxide includes absorbing the sulfur components and carbon dioxide from the sour syngas stream in a primary liquid/vapor phase absorption stage with a solvent to produce a liquid absorbent stream. The liquid absorbent stream includes the solvent, the sulfur components, and carbon dioxide. A portion of the sulfur components from the liquid absorbent stream is directly oxidized in the presence of a direct oxidation catalyst to produce elemental sulfur and a recycle stream. The recycle stream includes an unconverted portion of the sulfur components and carbon dioxide. The recycle stream is recycled for further absorption of the unconverted portion of the sulfur components and carbon dioxide through liquid/vapor phase absorption.

16 Claims, 1 Drawing Sheet

(51) Int. Cl.
*B01D 53/14* (2006.01)
*C01B 17/04* (2006.01)

(56) References Cited

U.S. PATENT DOCUMENTS

2003/0021744 A1* 1/2003 DeBerry ............ B01D 53/1468
423/228
2010/0251613 A1* 10/2010 Thacker ............. B01D 53/1462
48/76

* cited by examiner

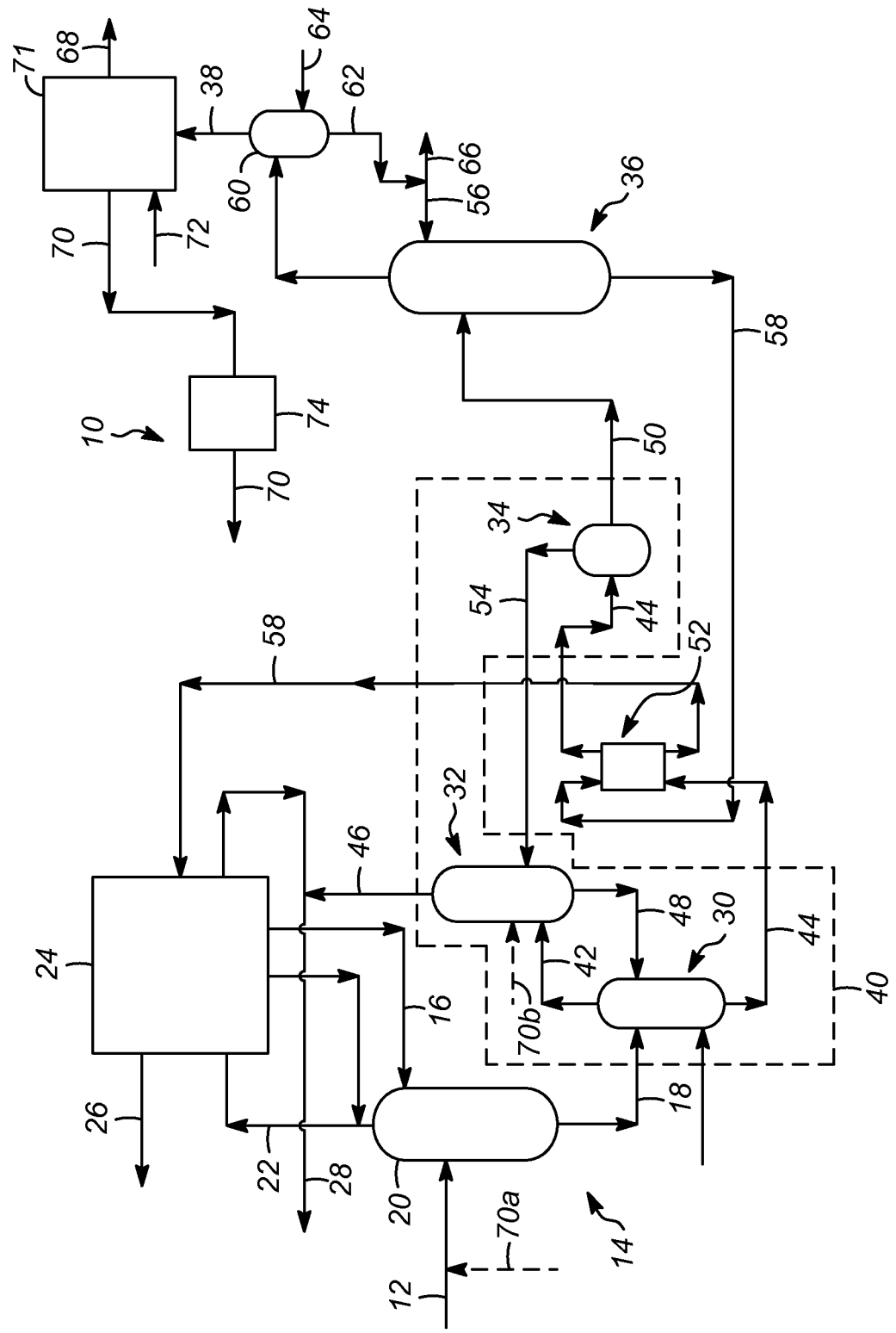

SOUR SYNGAS TREATMENT APPARATUSES AND PROCESSES FOR TREATING SOUR SYNGAS COMPRISING SULFUR COMPONENTS AND CARBON DIOXIDE

TECHNICAL FIELD

The technical field generally relates to sour syngas treatment apparatuses and processes for treating a sour syngas stream that includes sulfur components and carbon dioxide. More particularly, the technical field relates to apparatuses and processes for treating sour syngas streams with various units used for conventional sulfur recovery minimized or eliminated.

BACKGROUND

Gasification of biomass, coal emissions, and other sources of hydrocarbons is a common technique for producing syngas, which may be employed in a variety of downstream uses. Syngas may also be produced by steam reforming of coke. Syngas is often employed for power generation or chemical production. However, syngas generally includes a high content of acid gases (e.g., COS, $H_2S$, and $CO_2$) and other impurities that render the syngas unsuitable for downstream uses. Such impurity-laden syngas is often referred to as sour syngas.

Sour syngas is often subjected to various treatment stages to remove the acid gases and other impurities. Physical solvents (e.g., methanol and dimethyl ether polyethylene glycol) are commonly employed in liquid/vapor phase absorption stages to absorb sulfur-containing species and some carbon dioxide from the syngas, thereby producing an impurity-rich solvent stream and a separated syngas stream that still includes significant amounts of carbon dioxide. The separated syngas stream is fed to a carbon dioxide treatment stage for further removal of carbon dioxide from the separated syngas stream to produce a carbon dioxide vent stream and a treated syngas stream.

Claus units are often employed to recover elemental sulfur from the impurity-rich solvent stream, with the elemental sulfur being usable in various industrial applications and with solvent recovered for further use in the liquid/vapor phase absorption stage (as well as in other separation units). Claus units are multi-stage processing units that include a combustion stage followed by catalytic stages. A concentrated derivative of the impurity-rich solvent is subject to combustion in the combustion stage to produce a combustion gas stream, with elemental sulfur produced and separated from the combustion gas stream. The combustion gas stream also contains other sulfur-containing species that are then converted to elemental sulfur in the catalytic stages.

Claus units generally require an elevated content of sulfur-containing species (e.g., at least 25 weight % of sulfur-containing species) in the feed thereto for purposes of maintaining combustion in the combustion stage. However, the impurity-rich solvent produced by the liquid/vapor phase absorption stages generally has a content of sulfur-containing species that is significantly less than 25 weight %. Thus, the impurity-rich solvent must be further processed through various additional separation stages to remove $CO_2$, thereby producing the concentrated derivative of the impurity-rich sulfur stream. For example, nitrogen stripping and multiple flash columns are often required to increase the proportion of sulfur-containing species in the impurity-rich solvent. Such additional unit operations render sulfur recovery costly and complex.

Accordingly, it is desirable to minimize or reduce various units used for sulfur recovery from an impurity-rich solvent stream produced during sour syngas treatment. It is also desirable to minimize the complexity of sulfur recovery during sour syngas treatment. Furthermore, other desirable features and characteristics will become apparent from the subsequent detailed description and the appended claims, taken in conjunction with the accompanying drawings and this background.

BRIEF SUMMARY

Sour syngas treatment apparatuses and processes for treating a sour syngas stream that includes sulfur components and carbon dioxide are provided herein. In an embodiment, a process for treating a sour syngas stream that includes sulfur components and carbon dioxide includes absorbing the sulfur components and carbon dioxide from the sour syngas stream in a primary liquid/vapor phase absorption stage with a solvent to produce a liquid absorbent stream. The liquid absorbent stream includes the solvent, the sulfur components, and carbon dioxide. A portion of the sulfur components from the liquid absorbent stream is directly oxidized in the presence of a direct oxidation catalyst to produce elemental sulfur and a recycle stream. The recycle stream includes an unconverted portion of the sulfur components and carbon dioxide. The recycle stream is recycled for further absorption of the unconverted portion of the sulfur components and carbon dioxide through liquid/vapor phase absorption.

In another embodiment, a process for treating a sour syngas stream that includes sulfur components and carbon dioxide includes absorbing the sulfur components and carbon dioxide from the sour syngas stream in a primary liquid/vapor phase absorption stage with a solvent to produce a liquid absorbent stream. The liquid absorbent stream includes the solvent, the sulfur components, and carbon dioxide. Carbon dioxide is separated from the liquid absorbent stream to produce a carbon dioxide stream and a sulfur-rich solvent stream. The sulfur-rich solvent stream includes the solvent, the sulfur components, and carbon dioxide. The sulfur components and carbon dioxide are separated from the sulfur-rich solvent stream in a thermal regeneration stage to produce an acid gas stream. The acid gas stream includes the sulfur components, carbon dioxide, and water. The sulfur components are present in an amount of from about 0.5 to about 15 weight % based upon the total weight of the acid gas stream. A portion of the sulfur components from the acid gas stream is directly oxidized in the presence of a direct oxidation catalyst to produce elemental sulfur and a recycle stream that includes an unconverted portion of the sulfur components and carbon dioxide. The recycle stream is recycled for further liquid/vapor phase absorption.

In another embodiment, a sour syngas treatment apparatus includes a primary liquid/vapor phase absorption stage that has the capacity to receive a sour syngas stream and a solvent stream. The primary liquid/vapor phase absorption stage also has the capacity to facilitate absorption of sulfur components and carbon dioxide from the sour syngas stream in vapor phase by solvent from the solvent stream in liquid phase. The primary liquid/vapor phase absorption stage also has the capacity to produce a liquid absorbent stream that includes the sulfur components and carbon dioxide. A direct oxidation stage is in fluid communication with the primary liquid/vapor phase absorption stage and has the capacity to facilitate direct oxidation of a portion of the sulfur components from the liquid absorbent stream in the presence of a direct oxidation catalyst to produce elemental sulfur and a recycle stream that includes an unconverted portion of the sulfur components and carbon dioxide. The direct oxidation stage is in fluid communication with the primary liquid/vapor phase absorption stage for recycling the recycle stream to the primary liquid/vapor phase absorption stage.

BRIEF DESCRIPTION OF THE DRAWINGS

The various embodiments will hereinafter be described in conjunction with the following drawing figure, wherein like numerals denote like elements, and wherein:

FIGURE is a schematic diagram of a sour syngas treatment apparatus and process for treating a sour syngas stream that includes sulfur components and carbon dioxide in accordance with an exemplary embodiment.

DETAILED DESCRIPTION

The following detailed description is merely exemplary in nature and is not intended to limit the sour syngas treatment apparatuses and processes for treating a sour syngas stream. Furthermore, there is no intention to be bound by any theory presented in the preceding background or the following detailed description.

Sour syngas treatment apparatuses and processes for treating a sour syngas stream that includes sulfur components and carbon dioxide are provided herein. In accordance with the apparatuses and processes described herein, the sulfur components are ultimately separated through liquid/vapor phase absorption with a solvent and treated to form elemental sulfur. Whereas conventional apparatuses and processes employ Claus units that include a combustion stage followed by catalytic stages, a portion of the sulfur components are directly oxidized to produce the elemental sulfur. Direct oxidation of the sulfur components involves catalytic oxidation of the sulfur components in the presence of a direct oxidation catalyst. While direct oxidation of the sulfur components is not as efficient as combustion followed by catalytic conversion as conducted in the Claus units, a lower concentration of the sulfur-containing component in the stream subject to direct oxidation is possible while still converting a portion of the sulfur components to elemental sulfur. A recycle stream that includes an unconverted portion of the sulfur components is produced after direct oxidation, and the recycle stream is recycled for further absorption of the unconverted portion of the sulfur components through liquid/vapor phase absorption. Because conversion of a portion of the sulfur components to elemental sulfur is possible with a lower concentration of the sulfur components in the stream subject to direct oxidation as compared to use of Claus units, conventional units used for sulfur recovery that function to increase the concentration of the sulfur components in the stream subject to sulfur conversion to elemental sulfur may be minimized in size or eliminated. Further, complexity of sulfur recovery may be minimized during sour syngas treatment because of the ability to conduct conversion to elemental sulfur at lower concentrations of the sulfur components in the stream subject to direct oxidation.

An exemplary embodiment of a process for treating a sour syngas stream that includes sulfur components and carbon dioxide will now be described with reference to an exemplary sour syngas treatment apparatus 10 as shown in the FIGURE. In accordance with the exemplary process, a sour syngas stream 12 is provided. As referred to herein, "sour syngas streams" are syngas streams that include sulfur components. The sulfur components include any compound in the sour syngas stream 12 that includes sulfur (e.g., hydrogen sulfide, carbonyl sulfide, and the like). Syngas is short for "synthesis gas" and can be produced by conventional techniques such as gasification of a hydrocarbon-containing feedstock. Prior to separation of components from the sour syngas stream 12, the sour syngas stream 12 includes a mixture of hydrocarbons, hydrogen, carbon monoxide, carbon dioxide, and the sulfur components as a result of the feeds employed to form the syngas.

The sulfur components and carbon dioxide are absorbed from the sour syngas stream 12 in vapor phase in a primary liquid/vapor phase absorption stage 14 with a solvent in liquid phase to produce a liquid absorbent stream 18 that includes the solvent, the sulfur components, and carbon dioxide. Also produced from the primary liquid/vapor phase absorption stage 14 is a separated syngas stream 22 in vapor phase that is depleted of sulfur-containing species and that is also depleted of a portion of carbon dioxide present in the sour syngas stream 12. In an embodiment and as shown in the FIGURE, the primary liquid/vapor phase absorption stage 14 includes a primary liquid/vapor phase absorption unit 20 (also referred to as a primary absorber) that has the capacity to receive the sour syngas stream 12 and the solvent stream 16, to facilitate absorption of the sulfur components and carbon dioxide from the sour syngas stream 12 in vapor phase by solvent from the solvent stream 16 in liquid phase, and to produce the liquid absorbent stream 18 that includes the sulfur components and carbon dioxide. The primary liquid/vapor phase absorption unit 20 may be configured to contact the sour syngas stream 12 and the solvent stream 16 therein through conventional liquid-vapor phase absorption techniques under conventional operating conditions. It is to be appreciated that, while the sulfur components are separated into the liquid absorbent stream 18, trace amounts of sulfur-containing species may still be present in the separated syngas stream 22 in accordance with known separation limits in liquid/vapor phase absorption stages using various solvents. It is also to be appreciated that a significant amount of carbon dioxide from the sour syngas stream 12 is separated into the separated syngas stream 22, although an appreciable amount of carbon dioxide is also separated into the liquid absorbent stream 18 in accordance with known separation dynamics in liquid/vapor phase absorption stages using various solvents. Suitable solvents that may be employed during liquid/vapor phase absorption include, but are not limited to, methanol, dimethyl ether of propylene glycol (DEPG), propylene carbonate, or n-methyl-2-pyrrolidone (NMP).

In embodiments, carbon dioxide is absorbed from the separated syngas stream 22 in a carbon dioxide absorption stage 24 to produce a treated syngas stream 26. Conventional carbon dioxide absorption units may be employed in the carbon dioxide absorption stage 24, with the solvent stream 16, the treated syngas stream 26, and a carbon dioxide stream 28 ultimately produced by the carbon dioxide absorption stage 24. The treated syngas stream 26 is substantially free of the sulfur components and carbon dioxide, with amounts of sulfur-containing species and carbon dioxide possibly present in amounts that are below measurement capabilities using conventional monitoring devices. The treated syngas stream 26 may be employed in various applications, including for power generation or chemical production.

The liquid absorbent stream 18 is further treated for separation of the sulfur components therefrom. Referring to the FIGURE, various separation stages 30, 32, 34, 36 may be employed to remove carbon dioxide and/or solvent from the liquid absorbent stream 18 prior to direct oxidation of the sulfur components. Because direct oxidation of the sulfur components is possible at relatively low concentrations of the sulfur components, carbon dioxide from the liquid absorbent stream 18 need not be removed therefrom. However, it is to be appreciated that some carbon dioxide may optionally be removed from the liquid absorbent stream 18 albeit to a much lesser extent than is necessary when Claus units are employed for treatment of the sulfur components. Solvent removal is generally conducted after the optional carbon dioxide removal stages 30, 32, 34, with carbon dioxide separated from the liquid absorbent stream 18 to produce a sulfur-rich solvent stream 50 that includes the solvent, the sulfur components, and carbon dioxide and with the sulfur-rich solvent stream 50 subject to separation in a thermal regeneration stage 36. In embodiments and referring to the FIGURE, the optional carbon dioxide removal stages 30, 32, 34 are included within zone 40, and any stages contained within zone 40 are optional and may be omitted from the sour syngas treatment apparatus 10. In embodiments, carbon dioxide is stripped from the liquid absorbent stream 18 in a nitrogen stripping stage 30 that is in fluid communication with the primary liquid/vapor phase absorption stage 14 to produce a carbon dioxide-rich stream 42 and a sulfur-rich stream 44. The carbon dioxide-rich stream 42 may be provided to a secondary liquid/vapor phase absorption stage 32, where carbon dioxide from the liquid absorbent stream 18 is released to further separate solvent from carbon dioxide and to produce a secondary absorber carbon dioxide stream 46 and a solvent return stream 48. The secondary absorber carbon dioxide stream 46 may be combined with carbon dioxide stream 28 and vented, and the solvent return stream 48 may be fed back to the nitrogen stripping stage 30.

Referring again to the FIGURE, the sulfur-rich stream 44 may be passed through a heat exchanger 52 and then subjected to further carbon dioxide removal in a flash drum stage 34 to produce a flash carbon dioxide stream 54 and the sulfur-rich solvent stream 50 that is ultimately subject to separation in the thermal regeneration stage 36. The flash carbon dioxide stream 54 may be fed to the secondary liquid/vapor phase absorption stage 32 for further separation along with the carbon dioxide-rich stream 42 from the nitrogen stripping stage 30.

As alluded to above, even when the various separation stages 30, 32, 34 are employed to removed carbon dioxide, the extent of carbon dioxide removal may be less than previously conducted when Claus units are used for treatment of the sulfur components such that smaller stages 30, 32, 34 may be employed. For example, the sulfur-rich solvent stream 50 may have a content of from about 85 to about 95 weight % carbon dioxide, from about 5 to about 15 weight % of the sulfur component, and from about 0.01 to about 0.1 weight % of the solvent, all based on the total weight of the sulfur-rich solvent stream 50 on a dry basis.

As alluded to above and referring to the FIGURE, the sour syngas treatment apparatus 10 further includes the thermal regeneration stage 36 in fluid communication with the primary liquid/vapor phase absorption stage 14. The sulfur components and carbon dioxide are separated from the liquid absorbent stream 18 in the thermal regeneration stage 36 to produce an acid gas stream 38 that includes the sulfur components, carbon dioxide, and water. In the thermal regeneration stage 36, the sulfur components, carbon dioxide, and water are separated from the solvent by employing a reboiler (not shown) to vaporize liquid within the thermal regeneration stage 36 and a condenser (not shown) to return a condensate into the thermal regeneration stage 36, with a lean solvent stream 58 also produced as a separated stream. In embodiments and although not shown in the FIGURE, it is to be appreciated that the liquid absorbent stream 18 may be directly separated in the thermal regeneration stage 36 in the absence of any intervening separation stages, including the aforementioned carbon dioxide separation stages 30, 32, 34, between the primary liquid/vapor phase absorption stage 14 and the thermal regeneration stage 36. In this regard, the sour syngas treatment apparatus 10 may be free of any intervening separation units between the primary liquid/vapor phase absorption stage 14 and the thermal regeneration stage 36. It is to be appreciated that any combination of the aforementioned carbon dioxide separation stages 30, 32, 34 may be included or omitted. For example, in embodiments, the sour syngas treatment apparatus 10 is provided in the absence of the nitrogen stripping stage 30 between the primary liquid/vapor phase absorption stage 14 and the thermal regeneration stage 36, but with the secondary liquid/vapor phase absorption stage 32 and, optionally, the flash drum stage 34 being provided. As another example, in other embodiments, the sour syngas treatment apparatus 10 is provided in the absence of the secondary liquid/vapor phase absorption stage 32 and the flash drum stage 34 between the primary liquid/vapor phase absorption stage 14 and the thermal regeneration stage 36.

Separation may be conducted in the thermal regeneration stage 36 under conventional conditions by which the sulfur-rich solvent stream 50 and water 56 are fed into the thermal regeneration stage 36, with carbon dioxide and the sulfur components along with steam separated in vapor phase from solvent in the liquid phase and the solvent separated in liquid phase as the lean solvent stream 58. Referring to the FIGURE, carbon dioxide, the sulfur components, and steam in vapor phase may be fed to a reflux drum 60 to further separate some of the water therefrom, thereby producing the acid gas stream 38 that is subject to direct oxidation. A makeup water stream 64 may also be provided to the reflux drum 60. A reflux stream 62 including the separated water and water from the makeup water stream 64 may be returned to the thermal regeneration stage 36 to provide the desired amount of water 56 for conducting separation in the thermal regeneration stage 36, and a water purge stream 66 may be separated from the reflux stream 62 to optimize the supply of water 56 to the thermal regeneration stage 36. In embodiments, the acid gas stream 38 has a content of the sulfur components of from about 0.5 to about 15 weight %, such as from about 5 to about 14 weight %, based upon the total weight of the acid gas stream 38 with the balance of the acid gas stream 38 being carbon dioxide, water, carbon monoxide, etc.

The lean solvent stream 58 may be passed through various heat exchangers, including heat exchanger 52, to heat the upstream sulfur-containing streams 44, 50 prior to separation in the thermal regeneration stage 36, and the lean solvent stream 58 may be provided to the carbon dioxide absorption stage 24 to assist with carbon dioxide separation from the separated syngas stream 22. Solvent from the lean solvent stream 58 is ultimately recycled to the primary liquid/vapor phase absorption stage 14.

The acid gas stream 38 is subject to direct oxidation to produce elemental sulfur 68 therefrom. More specifically, a portion of the sulfur components from the liquid absorbent stream 18 is directly oxidized in the presence of a direct oxidation catalyst to produce elemental sulfur 68 and a recycle stream 70 that includes an unconverted portion of the sulfur components and carbon dioxide. In embodiments and referring to the FIGURE, a direct oxidation stage 71 is in fluid communication with the primary liquid/vapor phase absorption stage 14 and has the capacity to facilitate direct oxidation of the portion of the sulfur components from the liquid absorbent stream 18 in the presence of the direct oxidation catalyst. Direct oxidation of the sulfur components involves catalytic oxidation of the sulfur components in the presence of the direct oxidation catalyst and oxygen. By "direct oxidation", it is meant that oxidation is the first treatment technique employed to convert the sulfur components and the portion of the sulfur components is directly oxidized in the absence of a combustion stage prior to direct oxidation. In embodiments, direct oxidation is the only unit operation conducted to treat the sulfur components from the liquid absorbent stream 18, with any untreated sulfur components recycled in the recycle stream 70.

Because the sulfur components primarily includes hydrogen sulfide, direct oxidation of the hydrogen sulfide is the primary reaction of concern during direct oxidation, although elemental sulfur 68 may also be separated from other sulfur-containing species during direct oxidation. The hydrogen sulfide may be directly oxidized in the presence of the direct oxidation catalyst and oxygen to produce elemental sulfur 68. In embodiments, the oxygen may be provided as an oxygen stream 72 having an oxygen content greater than that of air (e.g., greater than 21% by volume, such as from about 99.0 to about 99.9% by volume, based on the total volume of the oxygen stream 72). In other embodiments, the oxygen stream 72 may contain air or may have an oxygen content less than that of air. The content of oxygen in the oxygen stream 72 may impact recycling of the recycle stream 70, as set forth in further detail below, as excess oxygen will be included in the recycle stream 70. Suitable direct oxidation catalysts for converting the hydrogen sulfide to elemental sulfur include, but are not limited to, catalysts that include bismuth and vanadium. Operating conditions for conducting direct oxidation may include reaction temperatures of from about 400 to about 700° C., pressures of from about 145 to about 160 kPa, and a flow rate of the acid gas stream 38 of about 20 to about 300 Metric tons per day.

Conversion of hydrogen sulfide to elemental sulfur through direct oxidation is generally a low-yield process, and the recycle stream 70 is recycled for further absorption of the unconverted portion of the sulfur components and carbon dioxide through liquid/vapor phase absorption. For example, in embodiments, reduction of the concentration of the sulfur components between the acid gas stream 38 and the recycle stream 70 may be from about 80 to about 98 weight %, such as from about 80 to about 96 weight %, based on the total weight of the acid gas stream 38 on a dry weight basis.

As alluded to above, conditions during direct oxidation may impact further absorption of components from the recycle stream 70. In embodiments, the recycle stream 70*a* is recycled to the primary liquid/vapor phase absorption stage 14 for separation along with the sour syngas stream 12. In this embodiment, the direct oxidation stage 71 is in fluid communication with the primary liquid/vapor phase absorption stage 14 for recycling the recycle stream 70*a* to the primary liquid/vapor phase absorption stage 14. However, in other embodiments, the presence of excessive oxygen in the recycle stream 70 may oxidize hydrocarbons from the sour syngas stream 12 such that recycling of the recycle stream 70 to the primary liquid/vapor phase absorption stage 14 is undesirable. For example, when the oxygen stream 72 has an oxygen content greater than that of air, excess oxygen in the recycle stream 70 may be a concern. In this embodiment, the recycle stream 70*b* is recycled to the secondary liquid/vapor phase absorption stage 30, where hydrocarbons are generally not present. Further absorption, separation in the thermal regeneration stage 36, direct oxidation, and recycling of the sulfur components may then proceed in a loop in the manner described above.

In embodiments, the recycle stream 70 includes carbonyl sulfide (COS) and/or sulfur dioxide ($SO_2$), and may further comprise hydrogen sulfide that remains unconverted after direct oxidation. To minimize the content of COS and $SO_2$ the recycle stream 70 may be hydrogenated, e.g., in a hydrogenation bed 74, before returning the recycle stream 70 for further absorption of the unconverted sulfur components. Hydrogenation converts the COS and $SO_2$ into hydrogen sulfide, which then may be recovered and eventually subject to direct oxidation as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A process for treating a sour syngas stream comprising sulfur components and carbon dioxide, wherein the process comprises the steps of:

absorbing the sulfur components and carbon dioxide from the sour syngas stream in a primary liquid/vapor phase absorption stage with a solvent to produce a liquid absorbent stream comprising the solvent, the sulfur components, and carbon dioxide;

directly oxidizing a portion of the sulfur components from the liquid absorbent stream in the presence of a direct oxidation catalyst to produce elemental sulfur and a recycle stream comprising an unconverted portion of the sulfur components and carbon dioxide; and recycling the recycle stream for further absorption of the unconverted portion of the sulfur components and carbon dioxide through liquid/vapor phase absorption.

2. The process of claim 1, wherein directly oxidizing the portion of the sulfur components from the liquid absorbent stream comprises directly oxidizing the portion of the sulfur components from the liquid absorbent stream in the absence of a combustion stage prior to directly oxidizing the portion of the sulfur components from the liquid absorbent stream.

3. The process of claim 1, further comprising separating the sulfur components and carbon dioxide from the liquid absorbent stream in a thermal regeneration stage to produce an acid gas stream comprising the sulfur components, carbon dioxide, and water, and wherein directly oxidizing the portion of the sulfur components from the liquid absorbent stream comprises directly oxidizing the portion of the sulfur components from the acid gas stream.

4. The process of claim 3, wherein separating the sulfur components and carbon dioxide from the liquid absorbent stream in the thermal regeneration stage provides the acid gas stream with the sulfur components present in an amount of from about 0.5 to about 15 weight % based upon the total weight of the acid gas stream.

5. The process of claim 3, wherein separating the sulfur components and carbon dioxide from the liquid absorbent stream in the thermal regeneration stage comprises separating the liquid absorbent stream in the absence of a nitrogen stripping stage between the primary liquid/vapor phase absorption stage and the thermal regeneration stage.

6. The process of claim 3, wherein separating the sulfur components and carbon dioxide from the liquid absorbent stream in the thermal regeneration stage comprises separating the liquid absorbent stream in the absence of a secondary liquid/vapor phase absorption stage between the primary liquid/vapor phase absorption stage and the thermal regeneration stage.

7. The process of claim 3, wherein separating the sulfur components and carbon dioxide from the liquid absorbent stream in the thermal regeneration stage comprises separating the liquid absorbent stream in the absence of an intervening separation stage between the primary liquid/vapor phase absorption stage and the thermal regeneration stage.

8. The process of claim 3, further comprising releasing carbon dioxide from the liquid absorbent stream in a secondary liquid/vapor phase absorption stage between the primary liquid/vapor phase absorption stage and the thermal regeneration stage.

9. The process of claim 8, wherein recycling the recycle stream comprises recycling the recycle stream to the secondary liquid/vapor phase absorption stage.

10. The process of claim 9, wherein directly oxidizing the portion of the sulfur components from the liquid absorbent stream in the presence of the direct oxidation catalyst further comprises directly oxidizing the portion of the sulfur components exclusively with oxygen.

11. The process of claim 8, further comprising stripping carbon dioxide from the liquid absorbent stream in a nitrogen stripping stage between the primary liquid/vapor phase absorption stage and the secondary liquid/vapor phase absorption stage to produce a carbon dioxide-rich stream and a sulfur-rich stream, wherein the carbon dioxide-rich stream is provided to the secondary liquid/vapor phase absorption stage.

12. The process of claim 1, wherein recycling the recycle stream comprises recycling the recycle stream to the primary liquid/vapor phase absorption stage for separation along with the sour syngas stream.

13. The process of claim 1, wherein absorbing the sulfur components and carbon dioxide from the sour syngas stream in the primary liquid/vapor phase absorption stage further produces a separated syngas stream depleted of sulfur-containing species and a portion of carbon dioxide present in the sour syngas stream.

14. The process of claim 1, wherein directly oxidizing the portion of the sulfur components from the liquid absorbent stream comprises directly oxidizing hydrogen sulfide in the presence of the direct oxidation catalyst and oxygen to produce the elemental sulfur.

15. The process of claim 1, wherein the unconverted portion of the sulfur components comprises one or more of carbonyl sulfide or sulfur dioxide, and wherein the process further comprises hydrogenating the recycle stream prior to further absorption of the unconverted portion of the sulfur components.

16. A process for treating a sour syngas stream comprising sulfur components and carbon dioxide, wherein the process comprises the steps of:
    absorbing the sulfur components and carbon dioxide from the sour syngas stream in a primary liquid/vapor phase absorption stage with a solvent to produce a liquid absorbent stream comprising the solvent, the sulfur components, and carbon dioxide;
    separating carbon dioxide from the liquid absorbent stream to produce a carbon dioxide stream and a sulfur-rich solvent stream comprising the solvent, the sulfur components, and carbon dioxide;
    separating the sulfur components and carbon dioxide from the sulfur-rich solvent stream in a thermal regeneration stage to produce an acid gas stream comprising the sulfur components, carbon dioxide, and water, wherein the sulfur components are present in an amount of from about 0.5 to about 15 weight % based upon the total weight of the acid gas stream;
    directly oxidizing a portion of the sulfur components from the acid gas stream in the presence of a direct oxidation catalyst to produce elemental sulfur and a recycle stream comprising an unconverted portion of the sulfur components and carbon dioxide;
    recycling the recycle stream for further liquid/vapor phase absorption.

* * * * *